United States Patent [19]
Watanabe et al.

[11] Patent Number: 5,959,635
[45] Date of Patent: Sep. 28, 1999

[54] CHARACTER PATTERN GENERATOR

[75] Inventors: Hajime Watanabe, Osaka; Susumu Hasegawa, Sakai, both of Japan

[73] Assignee: Sharp Kabushiki Kaisha, Osaka, Japan

[21] Appl. No.: 08/730,308

[22] Filed: Oct. 11, 1996

[30] Foreign Application Priority Data

Oct. 12, 1995 [JP] Japan .................................. 7-264241

[51] Int. Cl.$^6$ .................................................. G06T 3/40
[52] U.S. Cl. ..................... 345/469; 345/144; 345/468; 345/470; 345/471; 345/472
[58] Field of Search ................................. 345/469, 470, 345/467, 471, 472, 144; 382/298

[56] References Cited

U.S. PATENT DOCUMENTS

| | | | |
|---|---|---|---|
| 4,897,638 | 1/1990 | Kokunishi et al. | 345/144 |
| 5,428,728 | 6/1995 | Lung et al. | 345/469 |
| 5,509,091 | 4/1996 | Aoki | 382/298 |
| 5,714,987 | 2/1998 | Otsuka | 345/467 |

FOREIGN PATENT DOCUMENTS

3-234559  10/1991  Japan .

*Primary Examiner*—Mark R. Powell
*Assistant Examiner*—Kimbinh T. Nguyen

[57] ABSTRACT

A character pattern generator includes a ROM for storing font data and attribute information of each point of each stroke forming the font data, and a CPU for recognizing a portion to be transformed of a contour shape of the stored font data based on the attribute information of each point. The CPU further adds to the recognized portion to be transformed, a control point for performing transformation into a character pattern having a specified typeface code. The CPU then calculates the coordinates of the control point based on a factor at each point of each stroke of the font data. The CPU then transforms the contour shape by using the added control point and the font data. Finally, the CPU generates the character pattern having the specified typeface code based on the contour shape of the transformed font data.

10 Claims, 11 Drawing Sheets

CHARACTER PATTERN GENERATOR

BACKGROUND OF THE INVENTION

1. Field of the Invention

The present invention relates to a character pattern generator, and more particularly to a character pattern generator for generating character patterns having different typefaces by transforming outline font data to change contour shapes.

2. Description of the Related Art

In information equipment and computers, character patterns are usually read out and output from a memory in which font data are stored for each character in advance in order to display and output characters. Oblique characters, characters having shadow, trimmed characters and the like are generated from each font data. For example, a character type (typeface) includes Mincho typeface, Gothic typeface, Lettre de somme, Printed style, Sosho typeface and the like. In order to increase the number of typefaces, it is necessary to prepare a memory in which character patterns corresponding to the typeface are stored as font data. Consequently, it is necessary to use a large capacity memory which is expensive and uneconomical.

In consideration of a data capacity, development and the like, a method for creating a plurality of typefaces from one font data has been desired. As an example of the prior art, a pattern transforming method has been proposed in which outline font data and attribute data belonging to a pattern shape for a control point are prepared, and a transformation parameter for pattern transformation is set to transform the shape of the end of the outline font data so that typefaces having different contour shapes are generated (see Japanese Unexamined Patent Publication No. Hei 3(1991)-234559).

FIGS. 12(a) to 12(c) are diagrams showing an example 1 of the processing of transforming outline font data according to the prior art and a pattern transforming method described in the Japanese Unexamined Patent Publication No. Hei 3(1991)-234559. In the case where the shape of an element (a contour line on the upper side of longitudinal stroke) shown in FIG. 12(a) is transformed into an element whose typeface has a sharp end shown in FIG. 12(c), the contour shape of an outline font is drawn by setting, as control points, the midpoint of the element and points which are lowered from the end-points of on the right and the left of the longitudinal stroke by an arbitrary numeric value as shown in FIG. 12(b). Thus, a typeface having the sharp element is obtained by transformation.

The shape of an end can tentatively be changed as described in the Japanese Unexamined Patent Publication No. Hei 3(1991)234559. However, the shape to be transformed interferes with the design of the generated character. Consequently, it is impossible to perform transformation of high quality.

Figure 12:
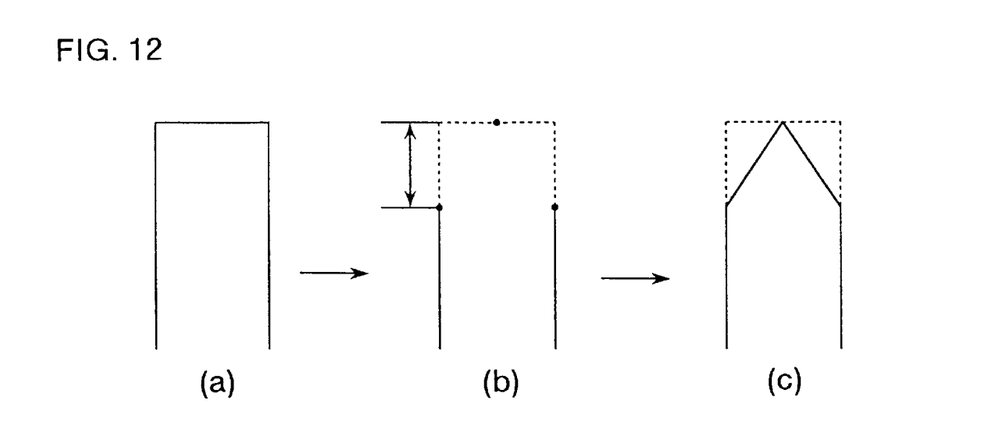
Figure 13:
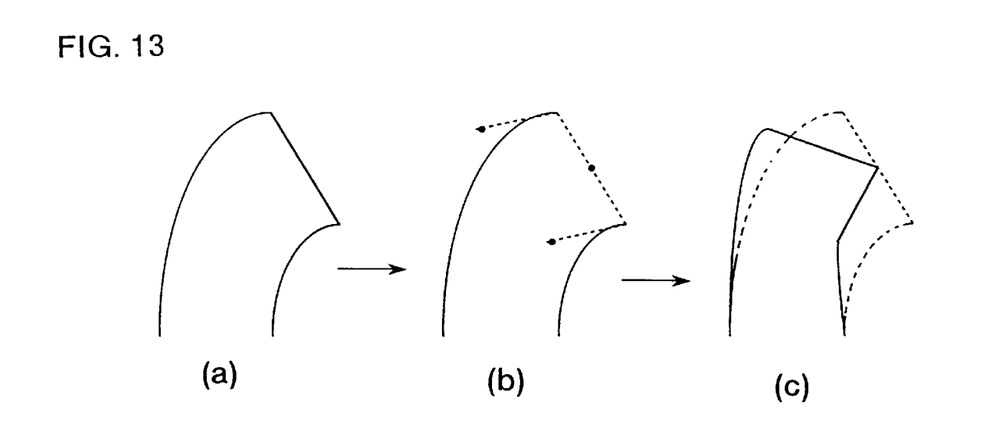

FIGS. 13(a) to 13(c) are diagrams showing an example 2 of the processing of transforming outline font data according to the prior art. In the case where the shape of an element shown in FIG. 13(a) is sharpened, the same processing as in the description of FIG. 12 is performed. Consequently, the contour shape of an outline font is drawn by setting, as control points, the midpoint of the contour line (element) of longitudinal strokes, and the points which are lowered from the endpoints of on the right and the left of the longitudinal stroke by an arbitrary numeric value so that a typeface having the sharp element is generated as shown in FIGS. 13(b) and 13(c). However, the contour which does not need to be transformed into the generated shape is also transformed. Consequently, the quality of the generated character is extremely lowered.

This is because the control point is set without taking the pattern shape of the outline font data (which is formed by the Bezier curve) into consideration.

Furthermore, since a constant value is input as the amount of movement of the control point, all portions which are to be transformed are transformed in the same way. Consequently, the processing of transformation cannot be performed effectively.

SUMMARY OF THE INVENTION

In consideration of the above-mentioned matters, it is an object of the present invention to provide a character pattern generator which can generate character patterns of high quality that has the same skeleton and different typefaces of characters from one outline font data, for example.

The present invention provides a character pattern generator in which outline font data having contour lines of character patterns approximated and expressed by curves or straight lines are transformed into character patterns having a specified typeface code, comprising means for storing font data and attribute information of each point of each stroke forming the font data, means for recognizing a portion to be transformed of a contour shape of the stored font data based on the attribute information of each point, means for adding to the recognized portion to be transformed a control point for performing transformation into the character pattern having the specified typeface code, means for calculating the coordinates of the control point based on a vector at each point of each stroke of the font data, means for transforming the contour shape by using the added control point and the font data, and means for generating the character pattern having the specified typeface code based on the transformed contour shape of the font data.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 10(*a*) to 10(*c*) are diagrams showing an example 3 of the processing of transforming a character font in the character pattern generator according to the present invention;

FIGS. 11(*a*) to (*c*) are diagrams showing an example 4 of the processing of transforming a character font in the character pattern generator according to the present invention;

FIGS. 12(*a*) to 12(*c*) are diagrams showing an example 1 of the processing of transforming outline font data according to the prior art; and FIGS. 13(*a*) to 13(*c*) are diagrams showing an example 2 of the processing of transforming outline font data according to the prior art.

DESCRIPTION OF PREFERRED EMBODIMENTS

The present invention provides a character pattern generator in which outline font data having contour lines of character patterns approximated and expressed by curves or straight lines are transformed into character patterns having a specified typeface code. The generator includes a memory for storing font data and attribute information of each point of each stroke forming the font data; a device for recognizing a portion to be transformed of a contour shape of the stored font data based on the attribute information of each point; a device for adding to the recognized portion to be transformed a control point for performing transformation into the character pattern having the specified typeface code; a device for calculating the coordinates of the control point based on a vector at each point of each stroke of the font data; a device for transforming the contour shape by using the added control point and the font data; and a device for generating the character pattern having the specified typeface code based on the transformed contour shape of the font data, wherein character patterns of high quality which have the same skeleton and different typefaces of characters are generated from one outline font data.

In the present invention, the storing means, the recognizing means, the control point adding means, the coordinate calculating means, the transforming means and the generating means are formed, for example, by a microcomputer comprising a CPU, a ROM, a RAM and an I/O port. The storing means is formed by the ROM, for example.

According to the present invention, countless font data can be generated from one outline font data, so that, even though the skeleton of the output character is the same, the typeface of the output character can be diversified. At the same time, a small amount of memory capacity of the font data is enough and any complicated transformation can be performed with natural connection to the shape of the original outline data kept as compared with the case where a memory for storing, as the font data, character patterns corresponding to the typefaces is prepared in order to increase the number of typefaces of the character according to the prior art. Unlike the prior art in which the original outline data itself is transformed to have a shape which is quite different from a desired shape, the font data of high quality can be obtained even though complicated transformation is performed.

It is preferable that the recognizing device should recognize, as a portion to be transformed, an element portion formed by segments between points of each stroke forming the character pattern.

With such a structure, by recognizing the element portion of each stroke forming a character as a portion to be transformed, it is possible to widely develop design such as conversion from Gothic typeface to Lettre de somme in which only the element portion is transformed. Furthermore, by recognizing the element portion, the portion to be transformed can be restricted. An increase in the transformed font data is controlled and the above-mentioned effects can be obtained. Even though the number of font data is decreased and only the element portion is transformed, the typeface can be differentiated more effectively in respect of design.

It is preferable that the coordinate calculating device should further comprise a device for calculating the length of a stroke including the portion to be transformed, and should calculate an amount of movement from the contour line based on the length of the stroke to obtain the coordinates of the control point.

With such a structure, it is possible to generate a character, wherein it is considered that transformation can be performed according to the length of the shape itself depending on the calculated stroke length, the amount of transformation can be regulated according to the shape in partially small or short portions of a character, and defacement, blur and the like are eliminated during display, output and the like.

It is preferable that the coordinate calculating device should further comprise a device for calculating the width of a stroke (an element formed by segments between points of the contour line) including a portion to be transformed, and should calculate an amount of movement from the contour line based on the width of the element to obtain the coordinates of the control point.

With such a structure, it is possible to generate a character, wherein it is considered that transformation can be performed according to the width of the shape itself depending on the calculated element width, the amount of transformation can be regulated according to the shape in partially small or short portions of a character, and defacement, blur and the like are eliminated during display, output and the like.

It is preferable that the coordinate calculating device should further comprise a device for calculating the length of a stroke including a portion to be transformed, means for calculating the width of the stroke (the element formed by segments between points of the contour line) including the portion to be transformed, and a device for calculating the ratio of the length of the stroke to the width of the store (the element portion), and should correct the coordinates of the control point based on the ratio of the length of the stroke to the width of the stroke (the element) when calculating an amount of movement from the contour line based on the length of the stroke and the width of the stroke (the element portion) to obtain the coordinates of the control point.

With such a structure, it is possible to generate a character, wherein it is considered that transformation can be performed according to the length and width of the shape itself depending on the calculated stroke length and element width, the amount of transformation can be regulated according to the shape in partially small or short portions of a character, and defacement, blur and the like are eliminated during display, output and the like.

The present invention will be described below in detail based on the preferred embodiments with reference to the drawings. The present invention should not be construed as being limited by the following embodiments. A character pattern generator according to the present invention is mainly applied to information equipment, computers and the like.

Figure 1:
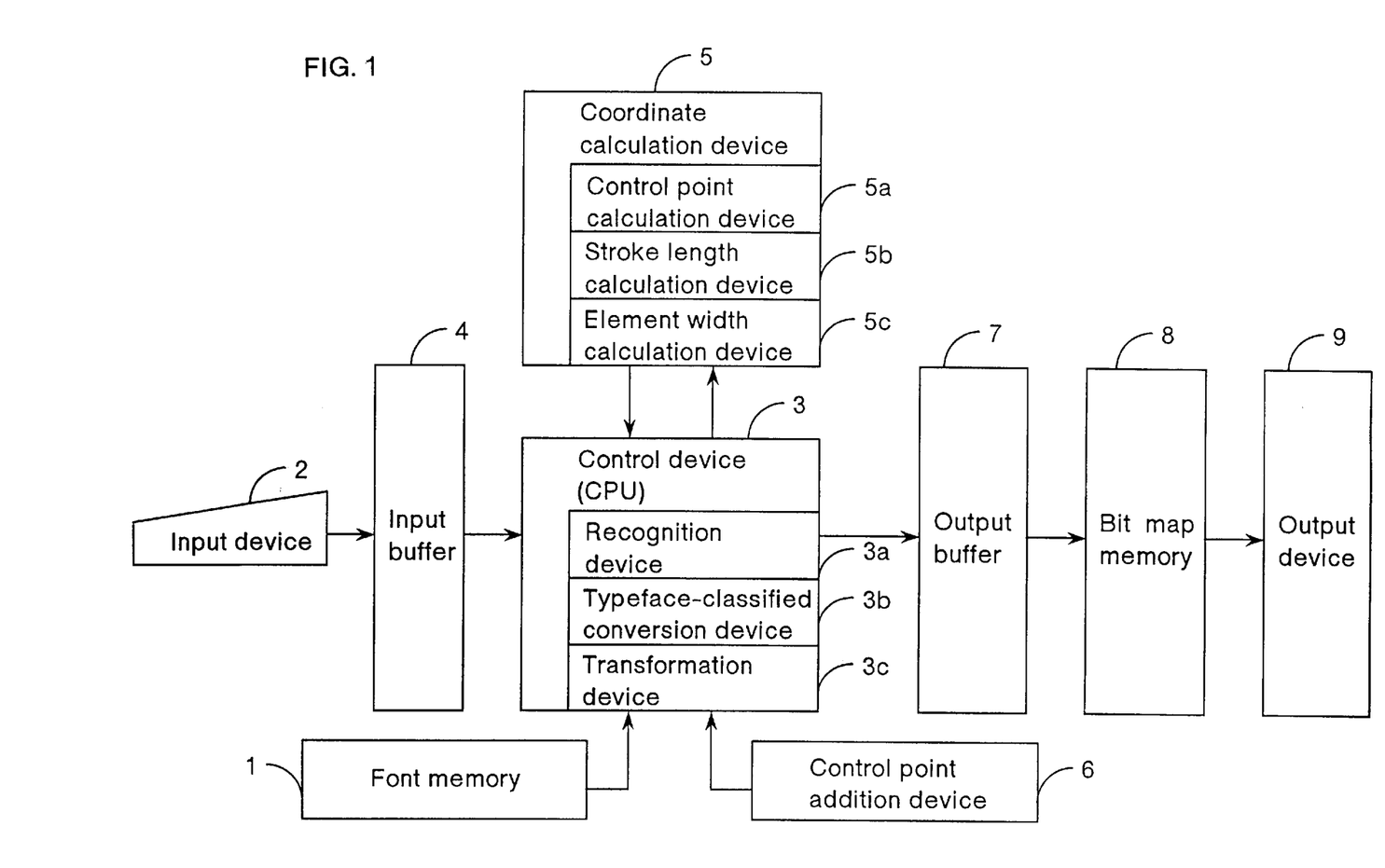
FIG. 1 is a block diagram showing a character pattern generator according to an embodiment of the present invention.

FIG. 1 is a block diagram showing a character pattern generator according to an embodiment of the present invention. In FIG. 1, the reference numeral 1 designates a font memory in which character information is stored, and is formed by a ROM. The font memory 1 corresponds, in an exemplary fashion, to storing means.

The reference numeral 2 designates an input device for inputting a character code and a typeface code for the character generation processing, and is formed with a keyboard, a pen, a tablet or the like.

The reference numeral 3 designates a control part for performing all operations for the character pattern generation processing, and is formed with a microcomputer including a CPU, a ROM and a RAM.

The control device 3 includes a memory (ROM) for programs and a memory (RAM) for works, and functions as a recognition device 3a, a typeface-classified conversion device 3b, and a transformation device 3c.

The reference numeral 4 designates an input buffer, and is formed with a RAM in which data input from the input device 2 is temporarily stored.

The reference numeral 5 designates a coordinate calculation device for calculating the coordinates of a control point. The coordinate calculation means 5 functions as a control point calculation device 5a, a stroke length calculation device 5b and an element width calculation device 5c.

The reference numeral 6 designates a control point addition device for adding a control point to the calculated coordinates. The coordinate calculation device 5 and the control point addition device 6 are controlled by a CPU of the control device 3.

The reference numeral 7 designates an output buffer, and is formed with a RAM in which font data generated as a result of the processing of the control device 3 is temporarily stored.

The reference numeral 8 designates a bit map memory (which corresponds to generating means), and is formed with a RAM which expands the font data of the output buffer 7 into bit map data.

The reference numeral 9 designates an output device. The output device 9 is formed with a display such as an LCD (a liquid crystal display), a CRT display or the like, and a printer such as a thermal printer, a laser printer or the like, and displays or prints character images based on the data output from the bit map memory 8.

Figure 2:
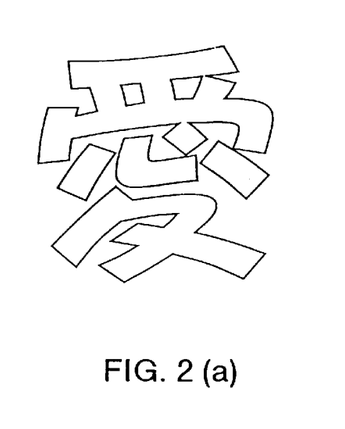
FIGS. 2(a) to 2(c) are diagrams showing an example of font data stored in a font memory.

FIGS. 2(a) to 2(c) are diagrams showing an example of the font data stored in the font memory. With reference to FIGS. 2(a) to 2(c), "stroke", "element" and "polygon" will be described below. Each line which forms a character is referred to as a "stroke". In case of a character " 七 (JIS code 3C37)", a first line (——) is a lateral stroke and a second line ( L ) is a longitudinal and lateral stroke. The end of the "stroke" is referred to as an "element".

A character " 愛 (JIS code 3026)" shown in FIG. 2(a) is font data having a contour approximated by a straight line and the Bezier curve.

In a part " 心 " of the character " 愛 " shown in FIG. 2(b), a thick solid line portion is the "element". A bag-shaped block including the "stroke" portion which expresses the line and the "element" portion which expresses the end is referred to as a "polygon".

In a part " 夂 " of the character " 愛 " shown in FIG. 2(c), a solid line is a "polygon".

Figure 3:
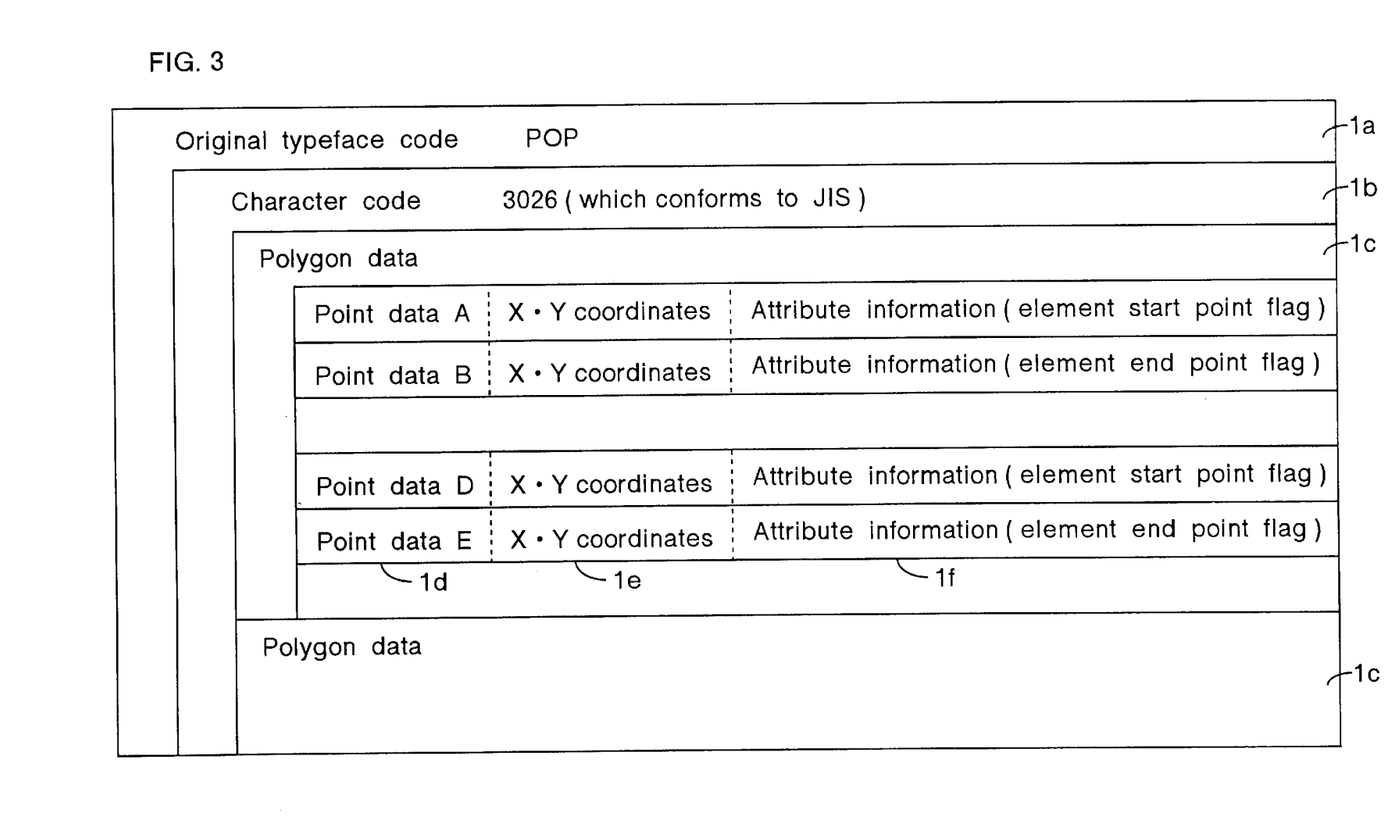
FIG. 3 is a diagram showing the structure of the font memory.
Figure 4:
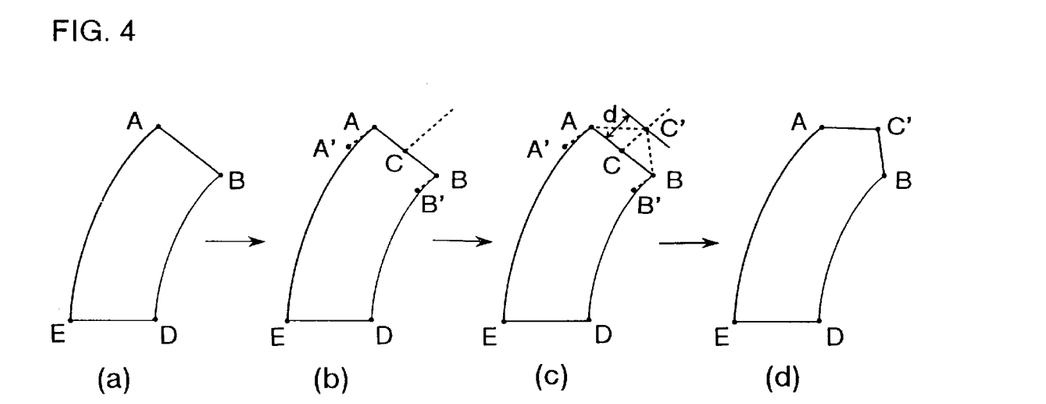
FIGS. 4(a) to 4(d) are diagrams showing an example 1 of the processing of transforming a character font in the character pattern generator according to the present invention.

FIG. 3 is a diagram showing the structure of the font memory. With reference to FIG. 3, the structure of the font memory 1 will be described below in detail.

The font data which is the origin of character generation is a font shown in FIG. 2(a) (that is, an outline font). In FIG. 2(a), a normal direction X is set in the right direction and a normal direction Y is set in the upward direction, and the coordinates of a point P on the polygon are expressed by (x, y). However, the font data to be processed in the present device is not restricted to this alone.

The font memory 1 has an original typeface code 1a (a pop typeface shown in FIG. 2(a)), a character code 1b (which conforms to JIS), polygon data 1c, point data 1d forming a polygon, coordinates 1e for each point, and attribute information (flag) 1f for each point. Each point forming the polygon is arranged clockwise. The attribute information (flag) 1f is formed by an element start point flag, an element end point flag, and the like.

FIGS. 4(a) to 4(d) are diagrams showing an example 1 of the processing of transforming a character font in the character pattern generator according to the present invention. FIGS. 5(a) to 5(d) are diagrams showing an example of the transformed character font in the character generator according to the present invention.

Figure 5:
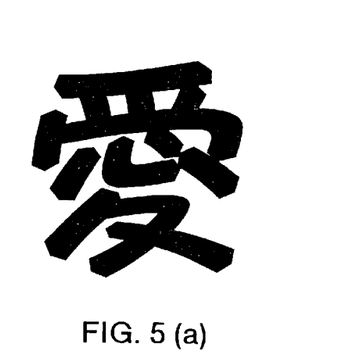
FIGS. 5(a) and 5(b) are diagrams showing an example of the transformed character font in the character pattern generator according to the present invention.

As the procedure for converting the polygon of a first "stroke" of " 心 " of a POP typeface character " 愛 " into a polygon having an ARROW typeface, an optional dividing point C (shown in FIG. 4(b)) between points A and B (shown in FIG. 4(a)) which are the element portions of a stroke is sharpened like AC'B (as shown in FIG. 4(d)). Thus, the conversion into a character " 愛 " shown FIG. 5(a) is sequentially performed.

The procedure for converting a character " 愛 " which is font data having a contour approximated by a straight line and the Bezier curve (the name of a typeface is "POP") shown in FIG. 2(a) into the character " 愛 " shown in FIG. 5(a) (the name of a typeface is "ARROW") will be described below with reference to a flowchart shown in FIG. 6.

Figure 6:
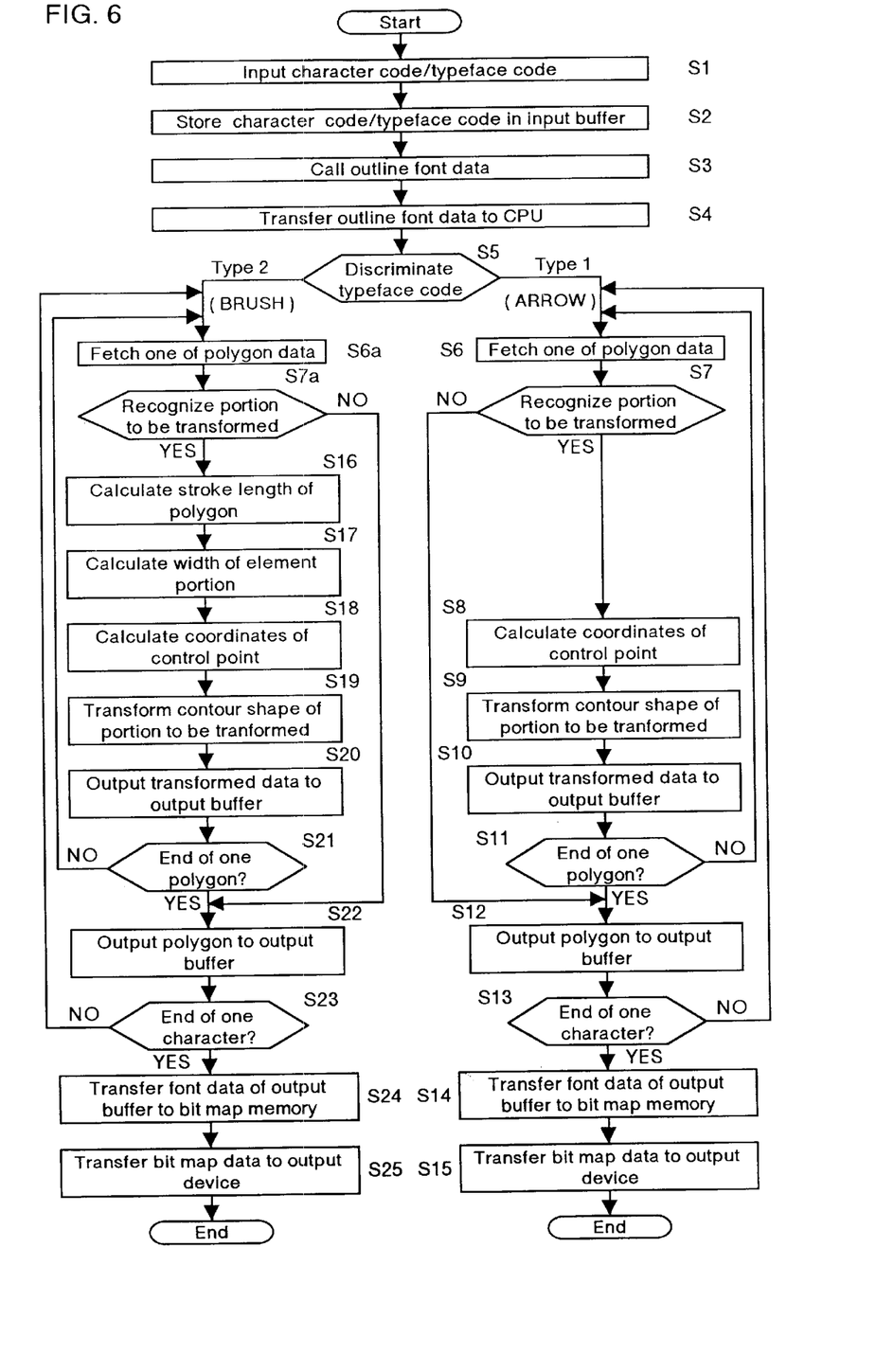
FIG. 6 is a flowchart showing the processing operation of the character pattern generator according to the present invention.

FIG. 6 is a flowchart showing the processing operation of the character generator according to the present invention.

Step S1: First of all, a character code (JIS code 3026) of a character " 愛 " to be generated and a typeface code (ARROW) by a keyboard or the like which is the input device 2 are input.

Step S2: The character code and the typeface code input at Step S1 are separately stored in the input buffer 4.

Step S3: The outline font data of an original POP typeface " 愛 " is called from the font memory 1 in accordance with the character code (JIS code 3026) stored in the input buffer 4.

Step S4: The called font data is transferred into a work memory in the control device 3. The control device 3 performs recognition, calculation, decision and the like.

Step S5: The typeface code "ARROW" stored in the input buffer 4 is transferred into the control device 3 so that a transforming method is determined by the typeface-classified conversion device 3b.

The procedure for determining the transforming method by the typeface-classified conversion device 3b in the control device 3 will be described below with reference to a flowchart shown in FIG. 7.

Figure 7:
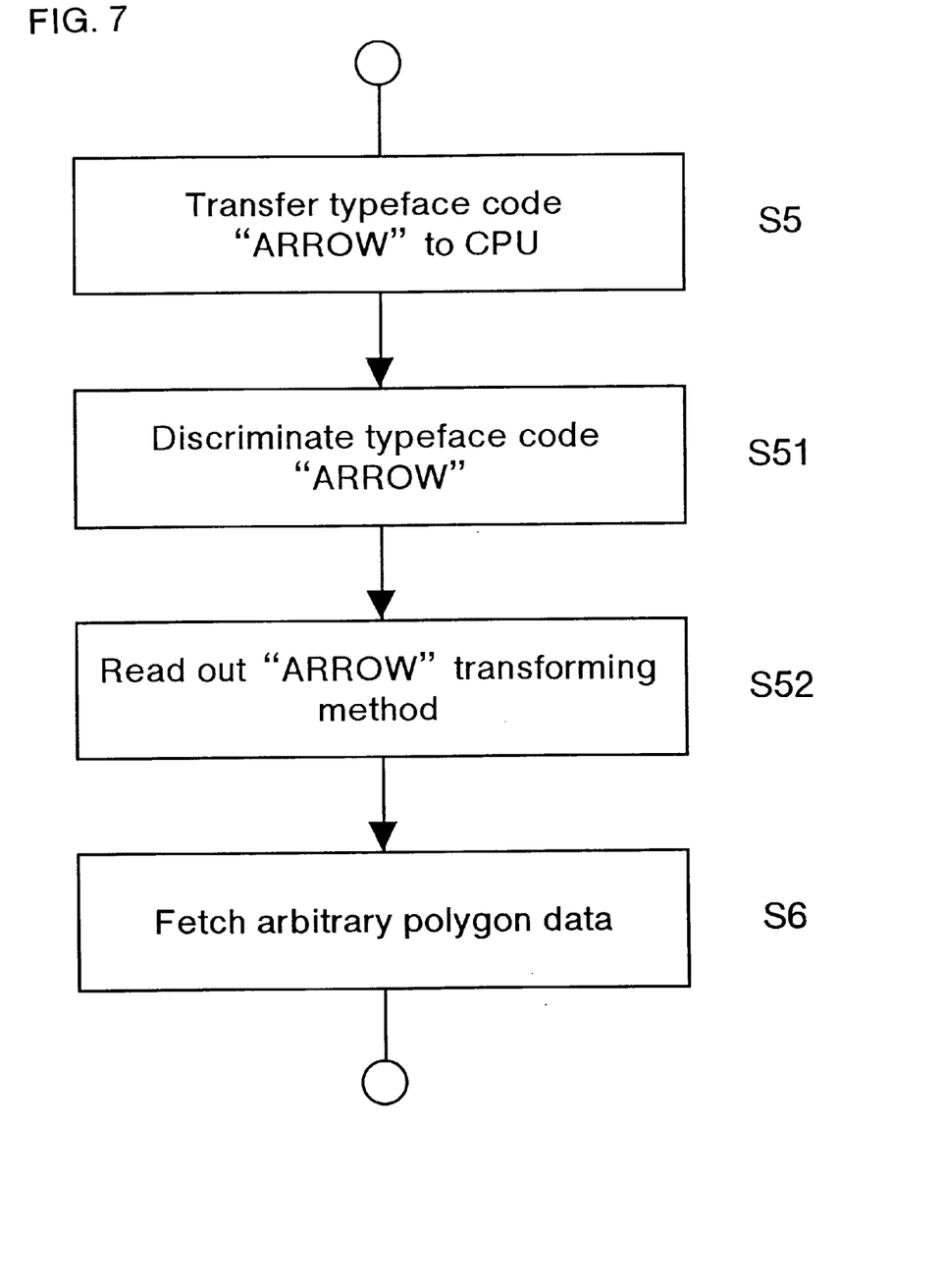
FIG. 7 is a flowchart showing a processing operation 1 of typeface-classified conversion.

FIG. 7 is a flowchart showing a processing operation 1 for typeface-classified conversion.

A typeface code is distinguished as "ARROW" (Step S51).

As a method for transforming a typeface code of "ARROW" (see FIG. 4), a method for sharpening, by d, a portion of the perpendicular distance between an element start point flag and an element end point flag is read out (Step S52).

It is sufficient that the perpendicular distance d is stored in the typeface-classified conversion device 3b in advance. When inputting a typeface code, the perpendicular distance d may be input and there is no restriction. The control device 3 performs recognition, calculation, decision and the like. In the case where the typeface code is "ARROW", Type 1 is selected at Step S5 shown in FIG. 6. Then, the routine proceeds to Step S6.

Step S6: Optional polygon data is fetched from the font data transferred at Step S4 in the work memory in the control device 3. The polygon data is fetched in order of arrangement of polygon data 1c stored in the font memory 1, for example.

Step S7: An element portion to be transformed is recognized, by the recognition device 3a, based on the polygon data fetched at Step S6.

The procedure for recognition is as follows. The element start point flag and the clockwise following element end point flag are recognized based on the attribute information (flag) of each point in order of the arrangement of polygons in the font memory 1. If the element portion is recognized, the routine proceeds to Step S8 for transformation. If a corresponding portion is not recognized, the routine proceeds to Step S12.

Step S8: The coordinates on a control point for transformation are calculated by the control point calculation device 5a in the element portion to be transformed which has been recognized at Step S7. The control point of the typeface code "ARROW" is added by the procedure performed at Step S5, which will be described below with reference to FIGS. 4(a) to 4(d).

In FIG. 4(a), an element portion to be transformed has a start point A and an end point B and an element portion on the opposite side has a start point D and an end point E in the polygon of a first "stroke" of " 心 "
of the character " 愛 "

In FIG. 4(b), an angle in the moving direction of a point C which divides a contour shape (straight line) for connecting points A and B into m:n is expressed by (nA'A+mB'B)/(n+m), wherein A' is a control point of the Bezier curve which is previous to the point A, B' is a control point next to the point B, and A'A and B'B are vectors. In case of the typeface code "ARROW", m:n=1:1 and a control point C' is on the extended line of the vector (A'A+B'B)/2 from the dividing point C.

In FIG. 4(c), the distance of movement from the dividing point C assumes an arbitrary value d so that the coordinates of the control point C' are determined.

In FIG. 4(d), the control point C' is added by the control point addition part 6.

Step S9: The Bezier curve is drawn in such a manner that the transformation device 3c causes the coordinates of the control point calculated at Step S8 to be newly connected to the element end point by a contour line. Consequently, the contour shape of the portion is transformed in the same manner as in FIG. 4(d).

Step S10: The data transformed at Step S9 is output to the output buffer 7.

Step S11: It is decided whether all the portions to be transformed of the polygon data fetched at Step S6 have been transformed in the control device 3 or not. If the transformation processing is terminated, the routine proceeds to Step S12. If the transformation processing is not terminated, the routine returns to Step S6 to fetch the same polygon data and recognize the next portion to be transformed.

Step S12: The polygon data which have been transformed are output to the output buffer 7.

Step S13: It is decided whether all the contour shapes forming a character transferred at Step S3 which are to be transformed have been transformed in the control device 3 or not. If the transformation processing is terminated, the routine proceeds to Step S14. If the transformation processing is not terminated, the routine returns to Step S6 to fetch the next polygon data.

Step S14: The font data in the output buffer 7 is transferred to the bit map memory 8.

Step S15: The bit map data in the bit map memory 8 is transferred to the output device 9. Thus, the processing is terminated.

In the processing operation described above, the dividing point is added and moved in accordance with the input typeface code. It is also possible to recognize the length of the stroke and the width of the element which form a character and to reflect the length of the stroke and the width of the element in order to calculate the coordinates of the control point.

Another processing operation will be described below. The whole structures of two kinds of processing operations are almost the same. In the above-mentioned processing operation, Step S1 to Step S4 are shared, and Step S10 to Step S15 correspond to Step S20 to Step S25. Consequently, the difference in Step S16 to Step S19 will be described below.

In the whole processing operation, a processing operation 1 includes Step S1 to Step S15 and a processing operation 2 includes Step S5 to Step S25.

Figure 11:
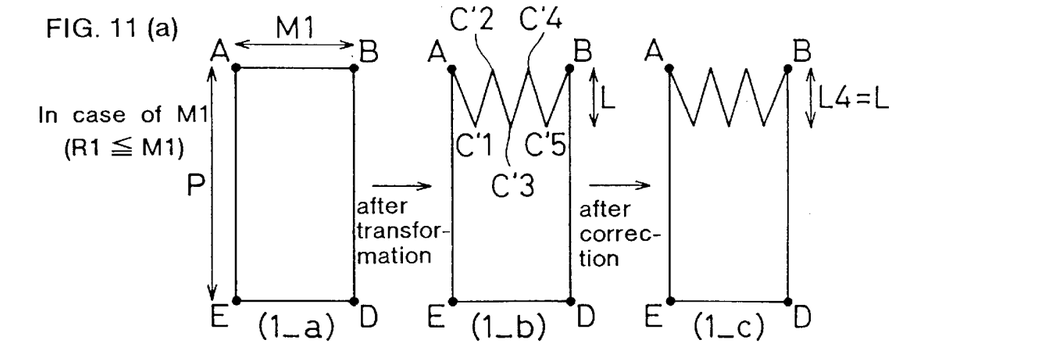

As shown in FIG. 11 (which will be described afterwards), new control points C'1 to C'5 are added to a portion between A and B (the element portion of a stroke) such as (1__a), (2__a) and (3__a) to be sharpened like (1__c), (2__c) and (3__c). Consequently, a character " 愛 " shown in FIG. 5(b) (the name of a typeface is BRUSH) is obtained. The procedure for converting the polygon of a first "stroke" of " 心 "
of the character " 愛 "
into the polygon of the typeface "BRUSH" will be described below.

The typeface code "BRUSH" stored in the input buffer 4 is transferred into the control device 3 (Step S5). The transforming method is decided by the typeface-classified conversion device 3b.

The procedure for deciding the transforming method by the typeface-classified conversion device 3b in the control device 3 will be described below with reference to a flow-chart shown in FIG. 8.

Figure 8:
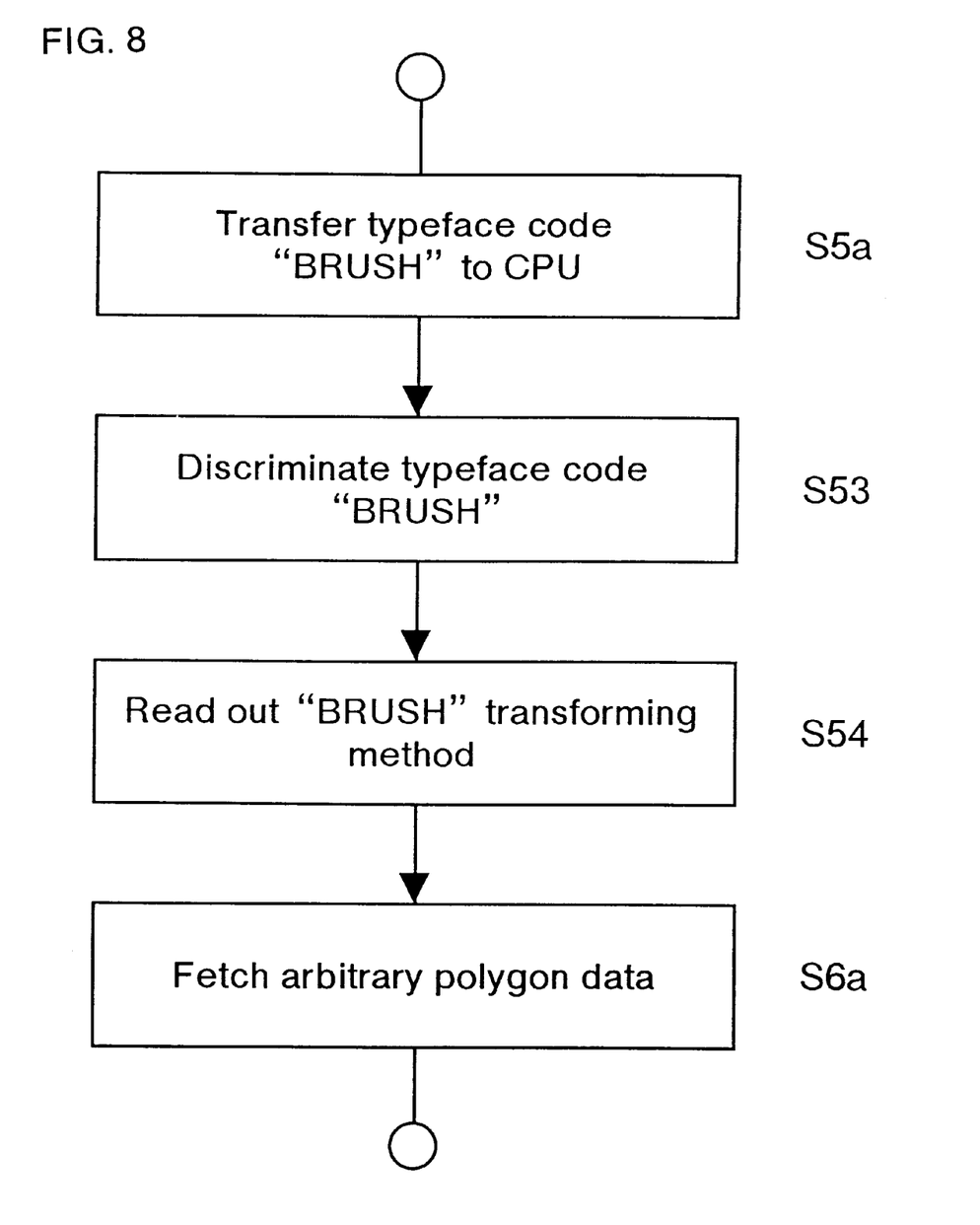
FIG. 8 is a flowchart showing a processing operation 2 of the typeface-classified conversion.
Figure 9:
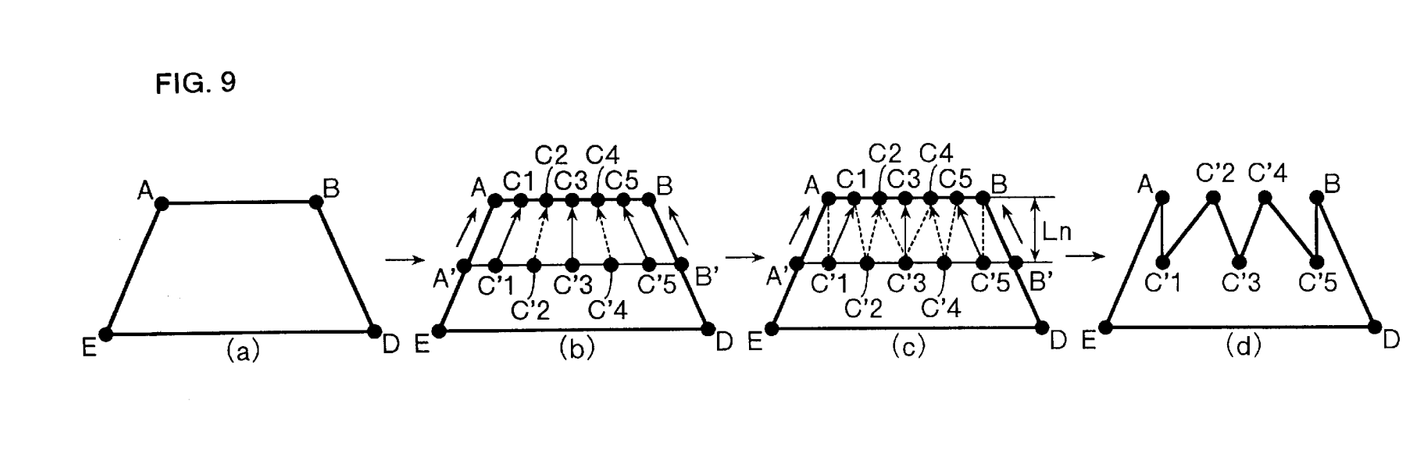
FIGS. 9(a) to 9(d) are diagrams showing an example 2 of the processing of transforming a character font in the character pattern generator according to the present invention.

FIG. 8 is a flowchart showing a processing operation 2 of typeface-classified conversion. It is decided that the typeface code is "BRUSH" (Step S53). As a method for transforming the typeface code "BRUSH", a method is read out (Step S54) in which the perpendicular distances of first, third and fifth ones of dividing points that divide a portion between the element start point flag and the element end point flag into six parts are inwardly sharpened, for example, by d as shown in FIG. 9 (which will be described below).

It is sufficient that the perpendicular distance d is stored in the typeface-classified conversion device 3b in advance. When inputting the typeface code, the perpendicular distance d may be input and there is no restriction. Recognition, calculation, decision and the like are performed in the control device 3. If the typeface code is "BRUSH", Type 2 is selected at Step S5 shown in FIG. 6. Then, the routine proceeds to Step S6.

Step S6a: Arbitrary polygon data is fetched from the font data transferred at Step S4 in the work memory of the control device 3. The polygon data is fetched in order of arrangement of polygon data 1c stored in the font memory 1, for example.

Step S7a: An element portion to be transformed is recognized by the recognition device 3a based on the polygon data fetched at Step S6a. The procedure for recognition is as follows. An element start point flag and a clockwise following element end point flag are recognized based on the attribute information (flag) of each point in order of arrangement of polygons in the font memory 1. If the element portion is recognized for transformation, the routine proceeds to Step S18. If a corresponding portion is not recognized, the routine proceeds to Step S22.

FIGS. 9(a) to 9(d) are diagrams showing an example 2 of the processing of transforming a character font in the character pattern generator according to the present invention. In FIG. 9(a), an element portion to be transformed has a start point A and an end point B and an element portion on the opposite side has a start point D and an end point E in the polygon of a first "stroke" of " 亠 " of the character " 愛 ".
The shape is shown by emphasizing an angle.

In FIG. 9(b), an angle in the moving direction of a point C which divides a contour shape (straight line) for connecting points A and B into m:n is expressed by nA'A+mB'B wherein A' is a control point of the Bezier curve which is previous to the point A, B' is a control point next to the point B, and A'A and B'B are vectors. In case of the typeface code "BRUSH", the contour shape (straight line) which connects the points A and B are divided into six parts.

The vector of the control point C'n is

C'1=(5A'A+1B'B)/6 C'2=(4A'A+2B'B)/6
C'3=(3A'A+3B'B)/6 C'4=(2A'A+4B'B)/6
C'5=(1A'A+5B'B)/6.

Step S16: A length P of the stroke of the polygon data fetched at Step S6a is calculated in the stroke length calculation part 5b of the coordinate calculation means 5.

Figure 10:
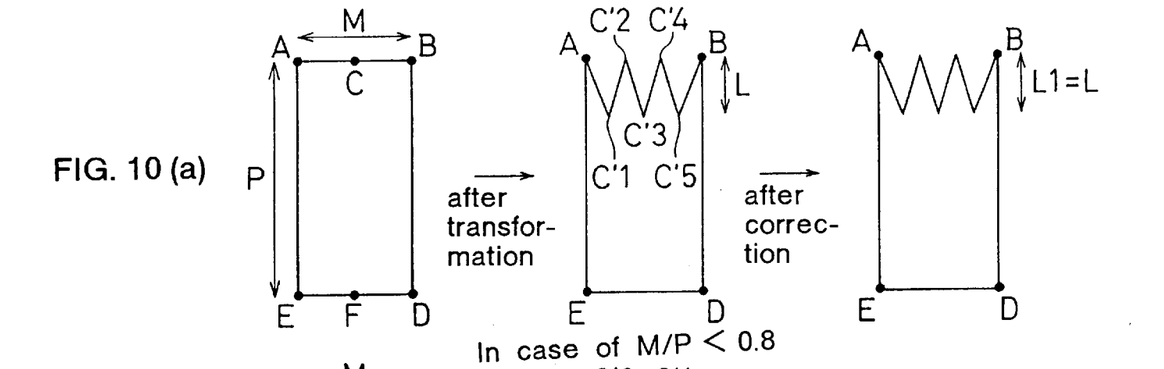

FIGS. 10(a) to 10(c) are diagrams showing an example 3 of the processing of transforming a character font in the character pattern generator according to the present invention.

A method for calculating the length P of the stroke will be described below with reference to FIG. 10(a). In FIG. 10(a), the coordinate values of the stroke are expressed by a start point A (x1, y1), an end point B (x2, y2) on the upper element portion, a midpoint C (x3, y3) of the points A and B, a start point D (x4, y4), an end point E (x5, y5) on the lower element portion, and a midpoint F of the points D and E (x6, y6).

The coordinates of the midpoint C are found by $x3=(x1+x2)/2$ and $y3=(y1+y2)/2$. The coordinates of the midpoint F are found by $x6=(x4+x5)/2$ and $y6=(y4+y5)/2$. The length P of the stroke is a distance CF between midpoints C and F of the elements.

$$\text{Stroke length } P=[(x6-x3)^2+(y6-y3)^2]^{1/2}$$

Step S17: The width M of the element portion to be transformed which is recognized at Step S7 is calculated by the element width calculation part 5c of the coordinate calculation part 5.

$$\text{Element width } M=[(x2-x1)^2+(y2-y1)^2]^{1/2}$$

Step S18: The direction of movement of the dividing points added at Step S8 is calculated with the ratio of the length P of the stroke calculated at Step S16 to the width M of the element portion calculated at Step S17.

In FIGS. 10(a) to 10(b), the distance between midpoints of two elements of polygon data is expressed by a stroke length P, the distance between both end points (points A and B) of the element is expressed by an element width M, a correction factor is expressed by H, the amount of normal movement is expressed by L, the amount of movement obtained after correction is expressed by Ln, and a correction reference is expressed by M/P. For the polygon data having a small stroke length P, the amount of movement of each dividing point is determined as follows.

For example, the correction reference M/P has boundaries of 0.8 and 1.0. The amount of movement of each dividing point is corrected as the case may be.

FIG. 10(a) In case of M/P<0.8, H=1.0, L1=L

FIG. 10(b) In case of 0.8≦M/P≦1.0, H=1−{(M/P)−0.8}, L2=HL

FIG. 10(c) In case of M/P>1.0, H=½, L3=L/2

As described above, the coordinates of the control point which meet the conditions are calculated.

FIGS. 11(a)–(c) are diagrams showing an example 4 of the processing of transforming a character font in the character pattern generator according to the present invention. In FIGS. 11(a)–(c), the distance between midpoints of two elements of polygon data is expressed by a stroke length P, the distance between both end points (points A and B in FIGS. 11(a)–(c)) of the element is expressed by an element width Mn, an element width fixed value is expressed by Rn, a correction factor is expressed by H, the amount of normal movement is expressed by L, and the amount of movement obtained after correction is expressed by Ln. For example, five dividing points are added onto the contour of a portion to be processed so as to move only the first, third and fifth dividing points. For the polygon data having a small element width M, the amount of movement of each dividing point is determined as follows.

It is assumed that the relationship of M3<R2<M2<R1≦M1 (wherein M1 is an ordinary element width which is not corrected, and M2 and M3 are element widths which are corrected) is satisfied, and the element width fixed value Rn is R1=700 meshes and R2=500 meshes when a character is expanded into 10000 meshes, for example.

FIG. 11(a) In case of R1≦M1, H=1, L4=L

FIG. 11(b) In case of M2<R1, ½<H<1, L5=HL

FIG. 11(c) In case of M3<R2, H=½, L6=L/2

As described above, the coordinates of the control point which meet the conditions are calculated. In FIG. 9(c), in the case where the typeface code is "BRUSH", the contour of a portion to be processed is divided into six parts. The coordinates of the control point are calculated from the dividing points C1, C3 and C5 so as to satisfy C'1=5A'A+1B'B, C'3=3A'A+3B'B, C'5=1A'A+5B'B. The distance of movement from the dividing point usually has an arbitrary value. For a portion to be processed which has the correction factor H, the corrected moving distance Ln is taken.

Step S19: In FIG. 9(d), the transformation part 3c causes the coordinates of the control point calculated at Step S18, the element start point and the element end point to be newly connected by a contour line so that the contour shape of a portion to be transformed is transformed. At steps on and after Step S19, the same processing procedure as the processing operation 1 is performed.

The processing operations performed on and after Step S19 are different from the processing operation 1 in that the moving distance is controlled. By performing such transformation, defacement, blur and the like are hardly generated in minute portions in case of display, print and the like. Consequently, font data of high quality can be generated.

According to the present invention, the following effects can be obtained.

(1) Countless font data can be generated from one outline font data so that the typeface of the output character can be diversified. At the same time, a small amount of memory capacity of the font data is enough and any complicated transformation can be performed with natural connection to the shape of the original outline data kept as compared with the case where a memory for storing, as the font data, character patterns corresponding to the typefaces is prepared in order to increase the number of typefaces of the character according to the prior art. Unlike the prior art in which the original outline data itself is transformed to have a shape which is quite different from a desired shape, the font data of high quality can be obtained even though complicated transformation is performed.

(2) By recognizing the element portion of each stroke forming a character as a portion to be transformed, it is possible to widely develop design such as conversion from Gothic typeface to Lettre de somme in which only the element portion is transformed. Furthermore, by recognizing the element portion, the portion to be transformed can be restricted. An increase in the transformed font data is controlled and the above-mentioned effects can be obtained. Even though the number of font data is decreased and only the element portion is transformed, the typeface can be differentiated more effectively in respect of design.

(3) It is possible to generate a character, wherein it is considered that transformation can be performed according to the length of the shape itself depending on the recognized stroke length, the amount of transformation can be regulated according to the shape in partially small or short portions of a character, and defacement, blur and the like are eliminated during display, output and the like.

(4) It is possible to generate a character, wherein it is considered that transformation can be performed according to the width of the shape itself depending on the recognized element width, the amount of transformation can be regulated according to the shape in partially small or short portions of a character, and defacement, blur and the like are eliminated during display, output and the like.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A character pattern generator in which a character pattern is transformed into an outline font data having a selectable typeface code, comprising:
   means for storing outline font data and attribute information of a plurality of points of each stroke forming the outline font data;
   means for selecting a character pattern and a typeface code;
   means for recognizing an end of each stroke forming the outline font data of the selected character pattern based on the attribute information of each point;
   means for calculating coordinates of a control point for performing transformation into the character pattern having the selected typeface code, based on the recognized end of each stroke;
   means for adding the calculated control point to the recognized end of each stroke;
   means for transforming a contour shape of the end of each stroke to include the added control point; and
   means for generating the outline font data of the character pattern having the selected typeface code based on the transformed contour shape.

2. The character pattern generator as defined in claim 1, wherein the coordinate calculating means further comprises means for calculating the length of a stroke, and calculates an amount of movement from the contour line based on the length of the stroke to obtain the coordinates of the control point.

3. The character pattern generator as defined in claim 1, wherein the coordinate calculating means further comprises means for calculating the width of a stroke, and calculates an amount of movement from the contour line based on the width of the stroke to obtain the coordinates of the control point.

4. The character pattern generator as defined in claim 1, wherein the coordinate calculating means further comprises means for calculating the length of a stroke, means for calculating the width of the stroke, and means for calculating the ratio of the length of the stroke to the width of the stroke, and corrects the coordinates of the control point based on the ratio of the length of the stroke to the width of the stroke when calculating an amount of movement from the contour line based on the length of the stroke and the width of the stroke to obtain the coordinates of the control point.

5. The character pattern generator of claim 1, wherein the means for calculating calculates coordinates of the control point based on a vector at each point of the recognized end of each stroke.

6. A character pattern generation method for transforming a character pattern into an outline font data having a selected typeface code, comprising the steps of:
   storing outline font data and attribute information of a plurality of points of each stroke forming the outline font data;
   selecting a character pattern and a typeface code;
   recognizing an end of each stroke forming the outline font data of the selected character pattern, based on the attribute information of each point;
   calculating coordinates of a control point for transformation into the character pattern having the selected typeface code, based on the recognized end of each stroke;
   adding the calculated control point to the recognized end of each stroke;
   transforming contour shape of the end of each stroke to include the added control point; and
   generating the outline font data of the character pattern having the selected typeface code based on the transformed contour shape.

7. The character pattern generation method of claim 6, wherein the step of calculating coordinates further includes calculating coordinates of the control point based on a vector at each point of the recognized end of each stroke.

8. The character pattern generation method of claim 6, wherein the step of calculating coordinates further includes calculating the length of a stroke and calculating an amount of movement from a contour line based on the length of the stroke to obtain the coordinates of the control point.

9. The character pattern generation method of claim 6, wherein the step of calculating coordinates further includes calculating the width of a stroke and calculating an amount of movement from a contour line based on the width of the stroke to obtain the coordinates of the control point.

10. The character pattern generation method of claim 6, wherein the step of calculating coordinates further includes calculating the length of a stroke, calculating the width of a stroke, calculating the ratio of the length of the stroke to the width of the stroke, and correcting the coordinates of the control point based on the ratio when calculating an amount of movement from a contour line based on the ratio to obtain the coordinates of the control point.

* * * * *